(12) United States Patent
King et al.

(10) Patent No.: US 6,683,905 B1
(45) Date of Patent: Jan. 27, 2004

(54) DUAL-MODE RECEIVER

(75) Inventors: Eric J. King, Greensboro, NC (US); Michael R. Kay, Summerfield, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 0 days.

(21) Appl. No.: 09/550,566

(22) Filed: Apr. 17, 2000

(51) Int. Cl.[7] .......................... H03K 9/00; H04L 27/22
(52) U.S. Cl. .................... 375/141; 375/316; 341/143
(58) Field of Search .................... 375/141, 211, 375/247, 326; 341/143, 144

(56) References Cited

U.S. PATENT DOCUMENTS

| | | | |
|---|---|---|---|
| 4,313,204 A | * 1/1982 | DeFreitas | 375/247 |
| 4,468,794 A | 8/1984 | Waters et al. | 375/103 |
| 4,866,442 A | * 9/1989 | Steim et al. | 341/143 |
| 4,878,228 A | * 10/1989 | Takahashi | 375/211 |
| 5,012,490 A | 4/1991 | Myer | 375/58 |
| 5,077,753 A | 12/1991 | Grau, Jr. et al. | 375/1 |
| 5,079,550 A | * 1/1992 | Sooch et al. | 341/143 |
| 5,121,415 A | 6/1992 | Goodman et al. | 375/103 |
| 5,142,551 A | 8/1992 | Borth et al. | 375/7 |
| 5,309,482 A | 5/1994 | Wright et al. | 375/103 |

(List continued on next page.)

OTHER PUBLICATIONS

Abeysekera et al., A Comparison of various low–pass filter architectures for sigma–delta demodulators, Jul. 1999, ISCAS '99, Proceedings of the 1999 IEEE International Symposium on Circuits and Systems, vol. 2, page(s) 380–383.*

(List continued on next page.)

Primary Examiner—Stephen Chin
Assistant Examiner—Lawrence Williams
(74) Attorney, Agent, or Firm—Withrow & Terranova, PLLC (57) ABSTRACT

A common dual-mode physical layer architecture for a communications receiver is capable of receiving either frequency hopping spread spectrum signals or direct sequence spread spectrum signals. A delta-sigma modulator is configured as an oversampling A/D converter with predetermined quantization noise shaping characteristics. The respective spread spectrum signal is processed by the delta-sigma modulator and then filtered via a decimation filter such as a (sin(x))/x filter to generate a quadrature signal having sufficient resolution to meet industry standards.

23 Claims, 6 Drawing Sheets

U.S. PATENT DOCUMENTS

| | | | | |
|---|---|---|---|---|
| 5,329,553 A | * | 7/1994 | Abbiate et al. | 375/247 |
| 5,345,406 A | | 9/1994 | Williams | 364/724.01 |
| 5,375,146 A | | 12/1994 | Chalmers | 375/103 |
| 5,553,050 A | | 9/1996 | Yang | 369/103 |
| 5,557,272 A | | 9/1996 | Riggio, Jr. | 341/100 |
| 5,557,642 A | * | 9/1996 | Williams | 375/316 |
| 5,602,602 A | | 2/1997 | Hulyalkar | 348/607 |
| 5,612,975 A | | 3/1997 | Becker et al. | 375/319 |
| 5,712,635 A | * | 1/1998 | Wilson et al. | 341/144 |
| 5,787,125 A | * | 7/1998 | Mittel | 375/329 |
| 5,802,118 A | | 9/1998 | Bliss et al. | 375/350 |
| 5,809,060 A | | 9/1998 | Cafarella et al. | 375/206 |
| 5,812,608 A | | 9/1998 | Välimäki et al. | 375/331 |
| 5,835,390 A | | 11/1998 | Trager | 364/724.1 |
| 5,880,687 A | | 3/1999 | May et al. | 341/61 |
| 5,959,562 A | | 9/1999 | Wiesbauer | 341/143 |
| 5,963,160 A | * | 10/1999 | Wilson et al. | 341/143 |
| 6,005,500 A | * | 12/1999 | Gaboury et al. | 341/143 |
| 6,057,791 A | * | 5/2000 | Knapp | 341/122 |
| 6,075,812 A | | 6/2000 | Cafarella et al. | 375/206 |
| 6,151,354 A | * | 11/2000 | Abbey | 375/211 |
| 6,169,506 B1 | * | 1/2001 | Oprescu et al. | 341/143 |
| 6,324,231 B1 | * | 11/2001 | Huang | 375/346 |
| 6,459,743 B1 | * | 10/2002 | Lipka | 375/329 |
| 6,516,183 B1 | * | 2/2003 | Hellmark | 455/78 |

OTHER PUBLICATIONS

Mueller et al., A mixed analog–digital realizatiion of the LMS algorithm using sigma–delta modulators, May 1993, 1993 IEEE International Symposium on Circuits and Systems, vol. 1, page(s) 882–885.*

John et al., Highly selective analog filters using Δ Σ based IIR filtering, May 1993, 1993 IEEE International Symposium on Circuits and Systems, vol. 2, page(s) 1302–1305.*

Engelen et al., New stability criteriia for the design of low–pass sigma delta modulators, Aug. 18–20, 1997, 1997 International Symposium on Low Power Electronics and Design, page(s) 114–118.*

Huang et al., Oversampled an analog FIR filters, Jun. 16–17, 1991, 1991 International Conference Proceedings on Circuits and Systems, vol. 2, page(s) 584–587.*

Feldman et al., A 13–Bit, 1.4–MS/s sigma–delta modulator for RF baseband channel applications, Oct. 1998, IEEE journal of Solid–State Circuits, vol. 33, No. 10, page(s) 1462–1469.*

* cited by examiner

DUAL-MODE RECEIVER

BACKGROUND OF THE INVENTION

(1) Field of the Invention

The present invention relates generally to radio frequency (RF) signal receivers and, more particularly, to a radio frequency receiver having a common dual-mode physical layer architecture capable of receiving and converting to baseband, both direct sequence spread spectrum signals and frequency hopping spread spectrum signals.

(2) Description of the Prior Art

The emergence of the Information Age has resulted in the need to connect virtually all computers into some type of network. Traditionally, groups of computers were networked together through direct, hard-wired connections to form local area networks (LAN), which are often connected to additional networks. Significant expense is associated with running cabling in new structures, as well as replacing, repairing or adding cabling to existing structures. Further, it is difficult to predict the preferred placement for receptacles and location of cabling. In order to eliminate the difficulties associated with cabling and to provide more flexibility in configuring and adding to existing local area networks, wireless local area networks (WLAN) have evolved. These wireless local area networks use radio frequency communications to replace the physical transmission medium of cables. Wireless local area networks are capable of using any number of analog and digital modulation techniques and protocols. In an effort to accommodate multiple modulation techniques, transceivers in wireless local area networks may be configured to deal with multiple modulation techniques.

One known direct conversion receiver for accommodating multiple modulation techniques uses a sample and hold circuit for subsampling an input signal. The output of the sample and hold circuit is applied to a sigma-delta loop to provide a high-speed, low-resolution data stream that in turn is applied to a decimator that provides a high-precision, low data rate signal having quadrature outputs. The above sigma-delta loop utilizes a bandwidth selection signal to select one of a preselected set of conversion bandwidths. In this way, only those signals which are of importance for receiving the modulated information are processed through the sigma-delta loop.

In view of the above, a receiver that is adaptable to multiple protocols and that uses a fixed A/D conversion rate delta-sigma converter is desirable, since such an architecture offers simplicity of design and will generally occupy less area on an integrated circuit than a similar device that uses a sigma-delta converter having a variable bandwidth.

SUMMARY OF THE INVENTION

The present invention is directed to a common receiver architecture for the conversion of RF signals to baseband for both direct sequence spread spectrum (DSSS) and frequency hopping spread spectrum (FHSS) signals. The receiver employs a low-pass delta-sigma modulator as an A/D converter, thereby taking advantage of the noise shaping properties of the quantization noise associated with the delta-sigma modulator. By utilizing an oversampling A/D converter with noise shaping, such as a delta-sigma modulator, the reduced bandwidth requirements for FHSS mode signals can be used to increase the resolution in the data path, enabling demodulation of Gaussian shaped Frequency Shift Keying (GFSK) waveforms. Any DC offset problems can be eliminated by incorporating a carrier error that is large relative to any deviation associated with a received waveform. In this way, errors contributed by DC components will be minimized.

The quantization noise in a low-pass delta-sigma modulator is shaped with lower frequencies containing less quantization noise than higher frequencies. The bandwidth requirements for FHSS are much less than the requirements for DSSS of a common data rate. This reduction in bandwidth in the FHSS waveform allows for an increased number of effective bits out of the delta-sigma modulator by simply placing a low-pass filter on the output of the delta-sigma modulator. Since the bandwidth is larger in the DSSS mode, the bandwidth of the low-pass filter on the output of the delta-sigma modulator can simply be increased to allow more quantization noise to exist at the output of the low-pass filter, thereby decreasing the effective number of bits, but still allowing for the resolution necessary to perform DSSS demodulation. The aforesaid reduction in bandwidth in the FHSS mode allows for the increased resolution necessary to perform FHSS demodulation.

The present invention comprises a low-pass delta-sigma modulator that is implemented as an A/D converter. The A/D converter is followed by a low-pass filter having a variable bandwidth. When demodulating DSSS signals, the bandwidth of the low-pass filter is adjusted to that necessary to capture the DSSS signals. When demodulating FHSS signals, the bandwidth of the low-pass filter is reduced to that necessary to capture the FHSS signals. Due to the noise shaping properties of the A/D converter, the low-pass filter effectively eliminates enough high end quantization noise at the output of the A/D converter to provide the resolution necessary for both DSSS and FHSS demodulation.

Accordingly, one feature of the present invention includes provision of a common architecture dual-mode physical layer capable of performing both DSSS and FHSS demodulation.

Another feature of the present invention includes provision of a receiver that is integrated on a single integrated circuit chip, and that is useable in a wireless local area network to receive both DSSS and FHSS signals.

These and other features of the present invention will become apparent to those skilled in the art after a reading of the following description of the preferred embodiment when considered with the drawings.

DESCRIPTION OF THE PREFERRED EMBODIMENTS

Figure 1A:
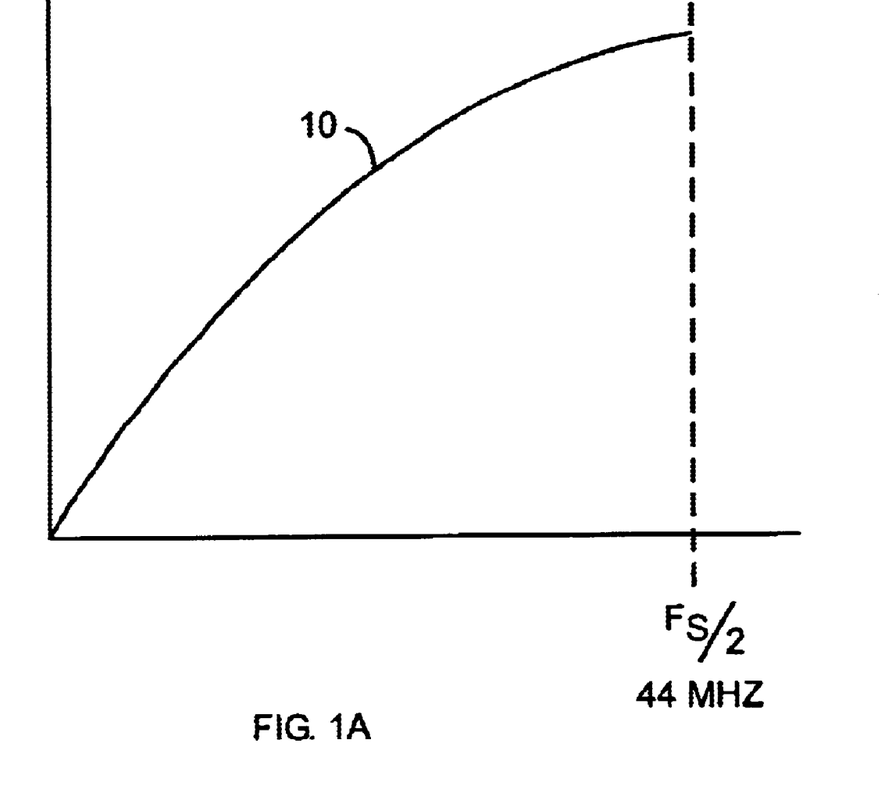
FIG. 1A is a graphical diagram illustrating the spectral density of quantization noise associated with a delta-sigma modulator for a one-half sampling rate frequency.

In the following descriptions, like reference characters designate like or corresponding parts throughout the several views. Referring now to the drawings in general and to FIG. 1A in particular, it will be understood that the illustrations are for the purpose of describing a preferred embodiment of the invention and are not intended to limit the invention thereto. As shown in FIG. 1A, a graphical diagram illustrates the typical spectral density of quantization noise 10 associated with a low-pass delta-sigma modulator for a particular sampling rate frequency. The quantization noise 10 can be seen to be small or nonexistent at low frequencies and increasingly larger at higher frequencies. The foregoing quantization noise 10 characteristics of low-pass delta-sigma modulators can be advantageous such that a common A/D architecture can be used to demodulate both direct sequence spread spectrum signals and frequency hopping spread spectrum signals.

Figure 1B:
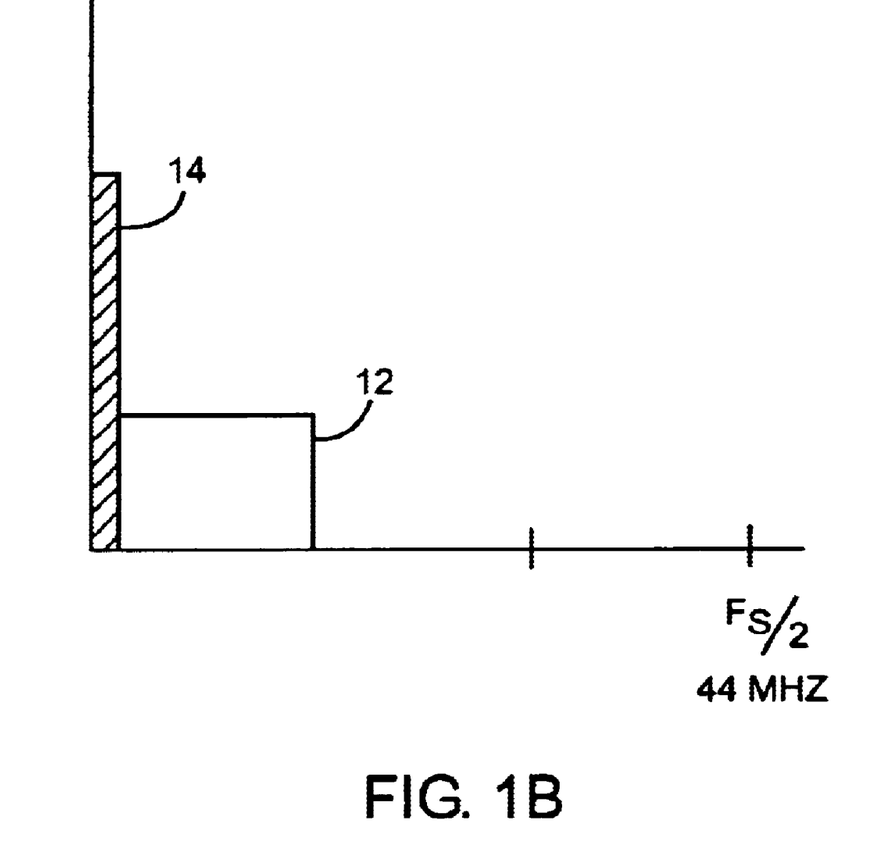
FIG. 1B is a graphical diagram illustrating a comparison between the bandwidth requirement for DSSS demodulation and the bandwidth requirement for FHSS demodulation.

FIG. 1B is a graphical diagram illustrating a comparison between the bandwidth requirement for DSSS demodulation and the bandwidth requirement for FHSS demodulation. A DSSS or direct sequence spread spectrum mode signal 12 has a single sided bandwidth of 11 MHz. During transmission of the DSSS signal 12, the total bandwidth is therefore 22 MHz. An FHSS or frequency hopping spread spectrum mode signal 14 has a single sided bandwidth of 1 MHz for a given transmission packet and frequency line. The foregoing DSSS signal 12 is always allowed to occupy the same transmission channel whereas the FHSS signal, although still retaining a 1 MHz single sided bandwidth, must change its transmission channel when a new packet is transmitted. With continued reference to FIGS. 1A and 1B, it can be seen that more quantization noise 10 will show up at the output of a delta-sigma modulator when a DSSS signal 12 is passed therethrough than when an FHSS signal 14 is passed therethrough. The wider signal bandwidth of the DSSS signal 12 allows more time for the inherent quantization noise 10 to reach a higher noise level. Thus, the signal to noise ratio can be seen to be smaller for a DSSS signal 12 passing through a low pass delta-sigma modulator than for an FHSS signal 14 passing through the same delta-sigma modulator.

Figure 2:
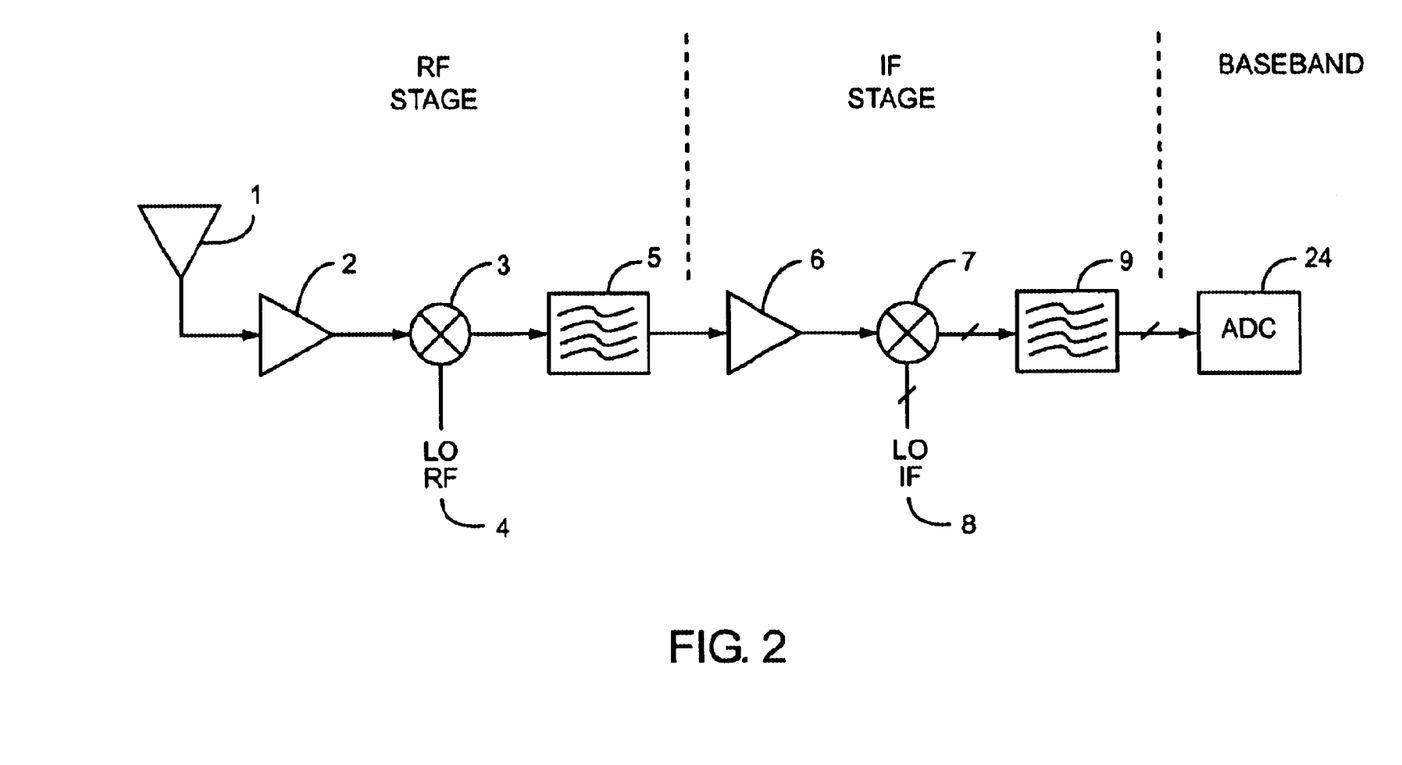
FIG. 2 is a simplified schematic diagram illustrating a receiver architecture.

In FIG. 2, the radio frequency and intermediate frequency stages of a typical super-heterodyne receiver are shown. Transmitted signals are received at an antenna 1 and passed to a low-noise amplifier 2 into a mixer 3 driven by a local oscillator 4 operating substantially at the carrier frequency. The resultant signal is filtered using a filter 5 and passed through an intermediate frequency amplifier 6 to a complex, quadrature mixer 7 driven by complex local oscillators 8 operating substantially at the intermediate frequency. The complex signals are filtered using filter 9. The filters 5 and 9 may be surface acoustic wave (SAW) filters. The complex baseband signals are sampled by an analog-to-digital Converter 24 to provide a digitized, complex, baseband signal.

Figure 3A:
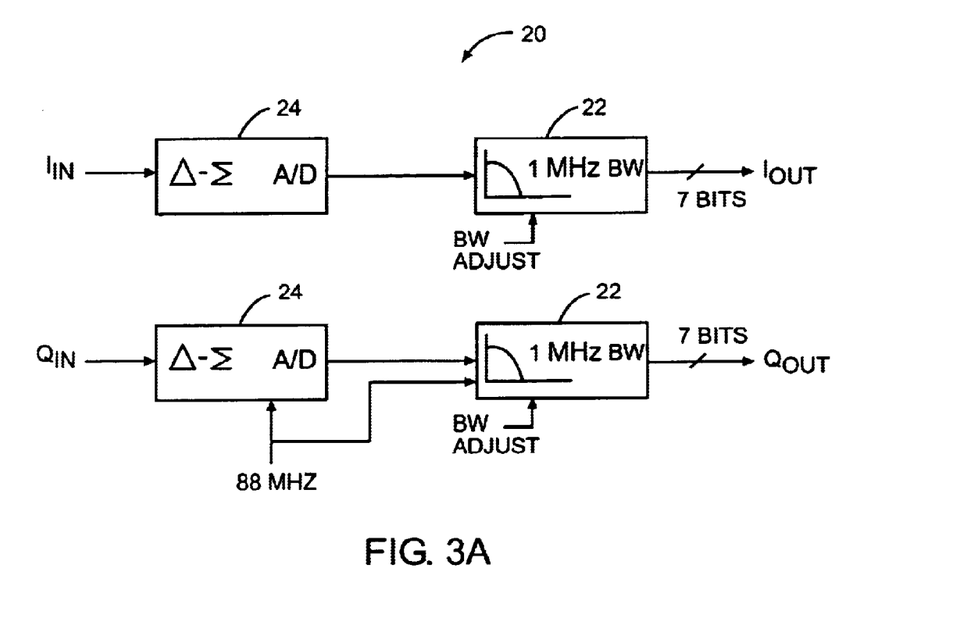
FIG. 3A is a simplified schematic diagram illustrating one embodiment of the present invention configured to accommodate demodulation of FHSS mode signals using a narrow bandwidth low-pass filter.

FIG. 3A is a simplified schematic diagram illustrating a demodulation system 20 according to one embodiment of the present invention configured to accommodate demodulation of FHSS mode signals 14 using a variable bandwidth low-pass filter 22 such as a (sin(x))/x filter that is well known to those skilled in the art and that is adjusted to have a narrow bandwidth. A description of filters suitable for use with the present invention and employing simpler add and delay operations is provided in reference to Hogenauer, "An Economical Class of Digital Filters for Decimation and Interpolation," *IEEE Transactions on Acoustics, Speech and Signal Processing*, Vol. ASSP-29, No. 2, Apr., 1981 (herein incorporated by reference). The present invention is not so limited, however, and it shall be understood that other types of low-pass filters or decimation filters can also be used as long as the requisite low pass filtering functionality is retained to yield the desired signal-to-noise ratios. The demodulation system 20 has a pair of delta-sigma modulators 24 that each functions as an A/D converter. Each delta-sigma modulator 24 is followed by a variable bandwidth low-pass filter 22 adjusted to have a narrow bandwidth, As described above. The low-pass filter 22 has a bandwidth of 1 MHz to pass the single-sided FHSS mode signal 4 having a 1 MHz single-sided bandwidth. As also stated above, since quantization noise associated with a delta-sigma modulator is shaped with lower frequencies containing less quantization noise than higher frequencies, the effectiveness of the delta-sigma modulator 24 as an A/D can be controlled with a low-pass filter at the output of the delta-sigma modulator 24. The demodulation system 20 includes use of a dual delta-sigma modulator/dual variable low-pass filter scheme having both in-phase (I) 26 and quadrature (Q) 28 inputs and outputs. When converting the single-sided FHSS mode signal 14 to baseband, the bandwidth of the low-pass filter 22 is decreased to allow accurate sampling of the input signal by significantly eluminating quantization noise associated with the delta-sigma modulator 24. The demodulator system 20 yields an output signal having a resolution (at least 7-bit) that easily exceeds the signal quality standards necessary to comply with known industry standards.

Figure 3B:
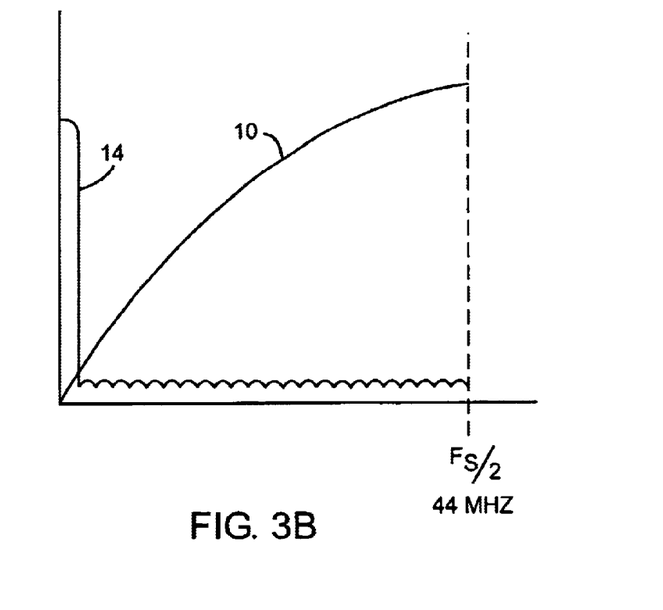
FIG. 3B is a graphical diagram illustrating the relationships between the quantization noise and the bandwidth of the low-pass filter for the embodiment shown in FIG. 3A.

FIG. 3B is a graphical diagram illustrating the relationships between the quantization noise 10 and the bandwidth of the low-pass filter 22 for the FHSS signal demodulator system 20 shown in FIG. 3A. An 88 MHz sampling rate is seen to produce a filtered response having very little quantization noise 10. The signal-to-noise ratio generated by the demodulator system 20 is thus sufficient to accommodate FHSS signal processing.

Figure 4A:
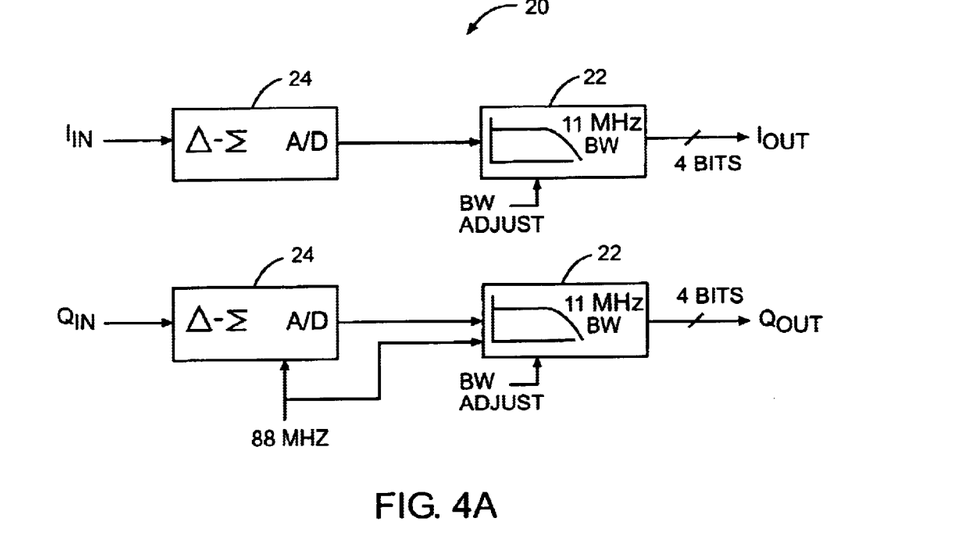
FIG. 4A is a simplified schematic diagram illustrating the embodiment of the present invention depicted in FIG. 3A configured to accommodate demodulation of DSSS mode signals using a wide bandwidth low-pass filter.

FIG. 4A is a simplified schematic diagram illustrating the embodiment of the present invention depicted in FIG. 3A, but that is now configured to accommodate demodulation of DSSS mode signals 12 using the variable low-pass filter 22 adjusted to have a bandwidth sufficiently wide to capture a DSSS mode signal 12 while effectively eliminating substantially that portion of the quantization noise 10 that resides beyond 11 MHz. The variable bandwidth low-pass filter 22 of the DSSS demodulator system 20 is now adjusted such that the low-pass filter 22 has a bandwidth of 11 MHz. Since more quantization noise 10 is passed through the low-pass filter 22 when the bandwidth is adjusted from 1 MHz to 11 MHz, the signal-to-noise ratio between the DSSS mode signal 12 and the quantization noise 10 is reduced from that obtained between the FHSS mode signal 14 and the quantization noise 10 when the low-pass filter 22 is adjusted to have a bandwidth of 1 MHz. The signal-to-noise ratio obtained during processing of DSSS mode signals 12 using the present invention, however, has been found by the present inventors to easily meet industry signal quality standards for DSSS signal processing. The DSSS output signal generated by the demodulator system 20 with a wide bandwidth low-pass filter 22 and using an 88 MHz sampling rate was found to have greatly improved (at least 4-bit) accuracy.

Figure 4B:
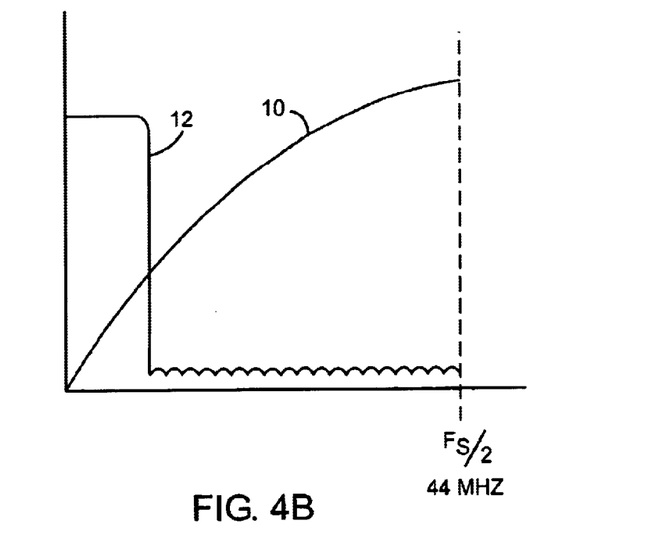
FIG. 4B is a graphical diagram illustrating the relationships between the quantization noise and the bandwidth of the low-pass filter for the embodiment shown in FIG. 4A.

FIG. 4B is a graphical diagram illustrating the relationships between the quantization noise 10 and the bandwidth of the variable bandwidth low-pass filter 22 for the embodiment shown in FIG. 4A. The signal-to-noise ratio between the DSSS mode signal 12 and the quantization noise 10 is now less than that obtained when demodulating an FHSS mode signal 14. The DSSS mode signal 12 amplitude, however, is sufficiently high that a high resolution output signal having 4-bit resolution is generated via the demodulation system 20.

Figure 5:
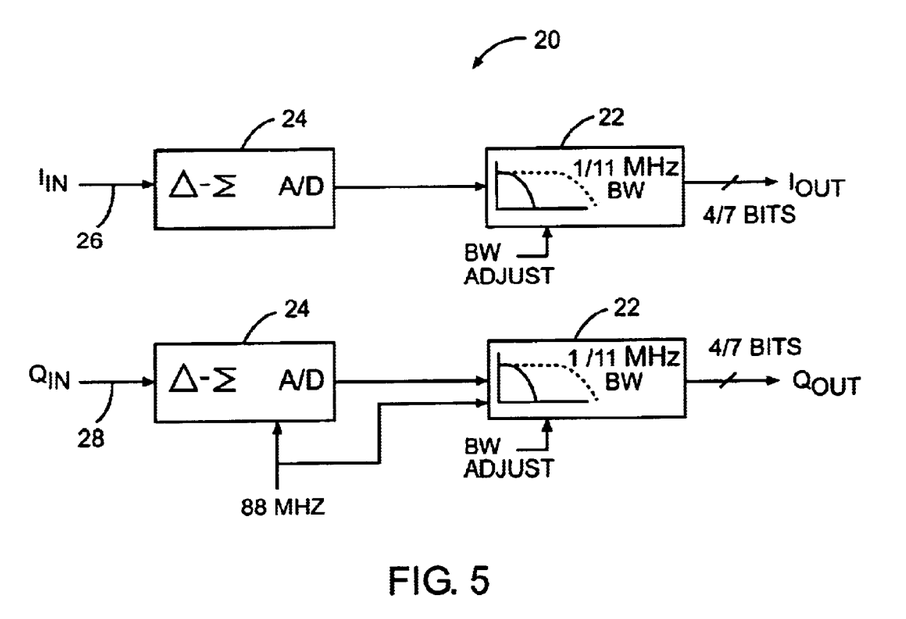
FIG. 5 is a simplified schematic diagram illustrating one embodiment of the present invention suitable for accommodating demodulation of both FHSS and DSSS mode signals.

FIG. 5 is a simplified schematic diagram illustrating one embodiment of the present invention suitable for accommodating demodulation of both DSSS and FHSS mode signals 12, 14. In-phase (I) 26 and quadrature (Q) 28 input signals, either DSSS mode signals 12 or FHSS mode signals 14, are passed through delta-sigma modulators 24. The delta-sigma modulators 24, as discussed above, produce noise during quantization of the input signals 12, 14 (quantization noise 10). This quantization noise 10 can be characterized as the low frequency response side of a pass-band where the quantization noise is non-existent at DC and increases with increasing frequency to a maximum level at higher frequencies. Because the foregoing FHSS mode signal 14 has a narrow single-sided bandwidth of only 1 MHz, the resultant output signal processed through the variable low-pass filter 22 will see only negligible quantization noise effects. Because the foregoing DSSS mode signal 12 has a wider single-sided bandwidth of 11 MHz, the resultant output signal processed through the variable low-pass filter 22 will see a greater amount of quantization noise 10; but due to the effects of low-pass filtering, the signal will still have enough resolution to meet industry quality standards for DSSS mode signals.

Certain modifications and improvements will occur to those skilled in the art upon a reading of the foregoing description. By way of example, just as the inventive embodiments disclosed herein describe specific dual-mode physical layer architectures, different architectures are possible with superior performance over classic single protocol architectures known in the art. For example, the present invention could be implemented with higher order delta-sigma modulators as well as multi-bit delta-sigma modulators. Further, the present invention can be constructed using various combinations of the aforesaid elements, as long as the requisite signal processing is present to tailor the quantization noise appearing at the output of the variable bandwidth low-pass filter(s). It should be understood that all such modifications and improvements have been deleted herein for the sake of conciseness and readability but are properly within the scope of the following claims.

We claim:

1. A dual-mode physical layer architecture for a communications receiver comprising:
   delta-sigma modulators configured to receive quadrature input signals and a clock signal having a first clock frequency, the delta-sigma modulator further configured to generate first quadrature output signals having quantization noise that is negligible at dc and that increases with increasing frequency; and
   a variable bandwidth low-pass filter coupled to the delta-sigma modulator and configured to receive the first quadrature output signals, the clock signal and a bandwidth adjust signal such that the bandwidth of the variable bandwidth low-pass filter is adjusted to generate second quadrature output signals having predetermined signal-to-noise ratios defined by the amplitude of the second quadrature output signals and quantization noise passed by the variable bandwidth low-pass filter.

2. The dual-mode physical layer architecture according to claim 1 wherein the delta-sigma modulator is configured as an oversampling analog-to-digital (A/D) converter.

3. The dual-mode physical layer architecture according to claim 1 wherein the variable bandwidth low-pass filter is configured to have a first bandwidth in response to a first bandwidth adjust signal and further configured to have a second bandwidth in response to a second bandwidth adjust signal.

4. The dual-mode physical layer architecture according to claim 3 wherein the variable bandwidth low-pass filter is further configured to generate a filtered digital quadrature signal having resolution when the variable bandwidth low-pass filter is configured to have the first bandwidth and the first quadrature output signals are frequency shift keying signals.

5. The dual-mode physical layer architecture according to claim 3 wherein the variable bandwidth low-pass filter is further configured to generate a filtered digital quadrature signal having a resolution when the variable bandwidth low-pass filter is configured to have the second bandwidth and the first quadrature output signals are direct sequence spread spectrum signals.

6. A dual-mode physical layer architecture for a communications receiver comprising:
   oversampling A/D converters configured with predetermined noise shaping characteristics and further configured to generate a quadrature output signal in response to a radio frequency input signal; and
   selectively variable bandwidth low-pass filters coupled to the oversampling A/D converters, the low-pass filters configured to receive the quadrature output signal to generate a filtered output signal having a predetermined signal-to-noise ratio defined by the amplitude of the filtered output signal and a filtered quantization noise signal amplitude defined by the predetermined noise shaping characteristics and the bandwidth of the low-pass filter.

7. The dual-mode physical layer architecture according to claim 6 wherein the oversampling A/D converter is a delta-sigma modulator.

8. The dual-mode physical layer architecture according to claim 6 wherein the noise shaping characteristics comprise quantization noise that is substantially nonexistent at DC and that increases in amplitude with increasing frequency.

9. The dual-mode physical layer architecture according to claim 6 wherein the selectively variable bandwidth low-pass filter is a (sin(x))/x filter.

10. The dual-mode physical layer architecture according to claim 6 wherein the selectively variable bandwidth low-pass filter is a decimation filter.

11. The dual-mode physical layer architecture according to claim 6 wherein the selectively variable bandwidth low-pass filter is configured to have a first bandwidth in response to a first bandwidth adjust signal and further configured to have a second bandwidth in response to a second bandwidth adjust signal.

12. The dual-mode physical layer architecture according to claim 11 wherein the selectively variable bandwidth low-pass filter is further configured to generate a filtered digital quadrature signal having a resolution of at least 7-bits when the selectively variable bandwidth low-pass filter is configured to have the first bandwidth and further when the quadrature output signal is a frequency hopping spread spectrum signal.

13. The dual-mode physical layer architecture according to claim 12 wherein the selectively variable bandwidth low-pass filter is further configured to generate a filtered digital quadrature signal having a resolution of at least 4-bits when the selectively variable bandwidth low-pass filter is configured to have the second bandwidth and further when the quadrature output signal is a direct sequence spread spectrum signal.

14. A dual-mode physical layer architecture for a communications receiver comprising:

means for oversampling an analog quadrature signal, converting the oversampled analog quadrature signal to a digital quadrature signal and shaping a quantization noise associated with the digital quadrature signal; and means for selectively filtering the digital quadrature signal and the quantization noise such that the quantization noise will be substantially reduced at frequencies beyond a bandwidth frequency determined by the filtering means.

15. The dual-mode physical layer architecture according to claim 14 further comprising means for selectively varying the bandwidth frequency of the filtering means.

16. The dual-mode physical layer architecture according to claim 15 wherein the filtering means comprises a low-pass filter.

17. The dual-mode physical layer architecture according to claim 16 wherein the low-pass filter is a $(\sin(x))/x$ filter.

18. The dual-mode physical layer architecture according to claim 16 wherein the low-pass filter is a decimation filter.

19. The dual-mode physical layer architecture according to claim 15 wherein the means for selectively varying the bandwidth frequency of the filtering means is controlled by the decimation ratio.

20. The dual-mode physical layer architecture according to claim 14 wherein the filtering means is configured to produce a digital quadrature signal in response to a frequency shift keyed signal, wherein the digital quadrature signal has a resolution of at least 7-bits.

21. The dual-mode physical layer architecture according to claim 14 wherein the filtering means is configured to produce a filtered digital quadrature signal in response to a direct sequence spread spectrum signal, wherein the filtered digital quadrature signal has a resolution of at least 4-bits.

22. A dual-mode physical layer architecture for a communications receiver comprising:

a delta-sigma modulator configured as an oversampling A/D converter having a predetermined quantization noise shaping capability such that quantization noise associated with the delta-sigma modulator is substantially zero at DC frequency and increases non-linearly with increasing frequency; and a low-pass $(\sin(x))/x$ filter electrically coupled to the delta-sigma modulator and configured to receive a spread spectrum input signal processed by the delta-sigma modulator and further configured to receive a bandwidth selection signal such that the $(\sin(x))/x$ filter will have a first bandwidth sufficient to generate a filtered output signal having a resolution of at least 7-bits when a frequency hopping spread spectrum signal is received by the $(\sin(x))/x$ filter and further such that the $(\sin(x))/x$ filter will have a second bandwidth sufficient to generate a filtered output signal having a resolution of at least 4-bits when a direct sequence spread spectrum signal is received by the $(\sin(x))/x$ filter.

23. A method of demodulating a direct sequence spread spectrum signal or a frequency hopping spread spectrum signal via an RF receiver having a common dual-mode physical layer architecture, the method comprising the steps of:

a) providing a delta-sigma modulator;

b) configuring the delta-sigma modulator as an oversampling A/D converter having a predetermined quantization noise shaping capability such that quantization noise associated with the delta-sigma modulator is substantially zero at DC frequency and increases non-linearly with increasing frequency;

c) providing a decimation filter; and d) configuring the decimation filter to receive a spread spectrum input signal processed by the delta-sigma modulator and further configuring the decimation filter to receive a bandwidth selection signal such that the decimation filter will have a first bandwidth sufficient to generate a filtered output signal having a resolution of at least 7-bits when a frequency hopping spread spectrum signal is received by the decimation filter and further such that the decimation filter will have a second bandwidth sufficient to generate a filtered output signal having a resolution of at least 4-bits when a direct frequency spread spectrum signal is received by the decimation filter.

* * * * *